United States Patent [19]
Mitchell et al.

[11] 3,773,442
[45] Nov. 20, 1973

[54] ROTARY MACHINE ROTOR SIDE SEAL GROOVE CONSTRUCTION

[75] Inventors: Alfred J. Mitchell; Mirko A. Bratkovic, both of Lansing, Mich.

[73] Assignee: General Motors Corporation, Detroit, Mich.

[22] Filed: Apr. 17, 1972

[21] Appl. No.: 244,823

[52] U.S. Cl. ................................................ 418/142
[51] Int. Cl. .... F01c 19/00, F04c 15/00, F04c 27/00
[58] Field of Search ..................................... 418/142

[56] References Cited
UNITED STATES PATENTS

| 3,180,560 | 4/1965 | Daschke | 418/142 |
| 3,171,590 | 3/1965 | Bentele et al. | 418/142 |
| 3,575,541 | 4/1971 | Hamada | 418/142 |
| 3,131,945 | 5/1964 | Scherenberg et al. | 418/142 |

*Primary Examiner*—William L. Freeh
*Attorney*—J. L. Carpenter et al.

[57] ABSTRACT

A rotor for a rotary machine has pairs of parallel side seal grooves in each rotor side extending between corner seal apertures also in each rotor side at the junction of adjoining peripheral rotor faces. Each pair of parallel side seal grooves is provided by an insert mounted in a single machined groove in each rotor side cooperating with radially inwardly and outwardly facing walls of the machined groove whose radii pass through the corner seal apertures at the opposite groove ends without intersecting the peripheral faces to facilitate machining the groove.

4 Claims, 4 Drawing Figures

PATENTED NOV 20 1973   3,773,442

ROTARY MACHINE ROTOR SIDE SEAL GROOVE CONSTRUCTION

This invention relates to rotary machine rotor side seal groove construction and more particularly to a rotary machine rotor having multiple side seal grooves formed from a single machined groove in the rotor.

In the formation of the rotor side seal grooves in the presently commercial rotary combustion engine of the Wankel type, these grooves are arcuate and have a depth-to-width ratio that is so high that conventional end mill cutters cannot satisfactorily meet the groove requirements. One solution to this problem has been offered by a new circular milling cutter disclosed in copending U.S. Pat. application Ser. No. 216,212, filed Jan. 7, 1972 by Harold W. Ferchland entitled "Milling Cutter" and assigned to the assignee of this invention. Instead of new tool design, the present invention is directed to a new rotor side seal groove construction wherein side seal grooves having high depth-to-width ratios may be provided with conventional end mill cutters.

According to the present invention, a rotor for use in a presently commercial rotary combustion engine of the Wankel type has an axially facing corner seal aperture extending parallel to the rotor's axis at the juncture of each adjoining pair of peripheral rotor faces and one of the two rotor sides. An axially facing circular arc groove is machined by a conventional end mill cutter in each rotor side extending between the apertures at the two junctures of each rotor face and has a radially inwardly facing wall and a radially outwardly facing wall extending parallel to the rotor axis. The circular arc groove walls have a center line parallel to the axis and radii that pass through the corner seal apertures at the opposite ends of the groove without intersecting any of the peripheral faces which has the advantage of enabling the end mill cutter to make a cutting pass without advancement or retraction at the corner seal apertures. A circular arc insert is then mounted in each circular arc groove and has a radially inwardly facing wall and a radially outwardly facing wall which cooperate with the respective inwardly and outwardly facing groove walls to provide a pair of axially facing circular arc side seal grooves that thus can have a depth-to-width ratio independent of the size of the end mill cutter that machines the insert receiving groove.

An object of the present invention is to provide a new and improvde side seal groove construction for the rotor or a rotary machine.

Another object is to provide a rotor for a rotary machine having pairs of side seal grooves whose depth-to-width ratio is independent of the size of the tool used to machine the rotor for such pairs of grooves.

Another object is to provide a rotor for a rotary machine having a single groove extending between corner seal apertures in a side of a rotor in a rotary machine wherein an insert is inserted into the groove and cooperates with the groove's radially opposed walls to provide a pair of side seal grooves having a depth-to-width ratio independent of the size of the groove formed in the rotor.

Another object is to provide a rotor for a rotary machine having an axially facing corner seal aperture at the juncture of each adjoining pair of rotor faces and one of the sides with an axially facing circular arc groove in each side extending between the apertures at the two junctures of each face which may be machined by a cutting tool making a continuous cutting pass without advancement or retraction at the corner seal apertures and an insert mounted in the circular arc groove and cooperating with the groove's radially inwardly and outwardly facing walls to provide a pair of parallel axially facing circular arc side seal grooves.

These and other objects of the present invention will be more apparent from the following description and drawing in which.

Figure 1:
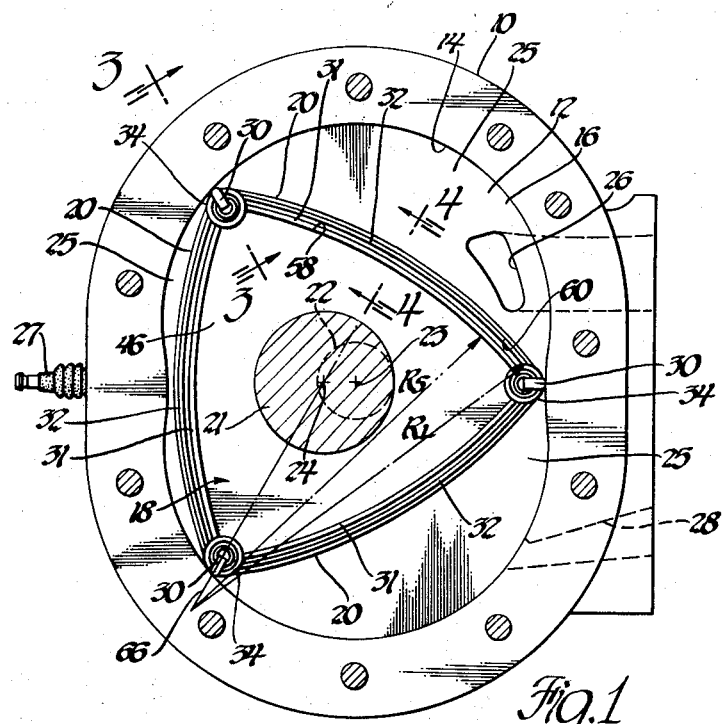
FIG. 1 is a transverse view of a rotary combustion engine with one end housing removed showing one side of the engine's rotor having side seal grooves constructed according to the present invention.

The rotor side seal groove construction according to the present invention is for use in rotary machines including rotary combustion engines, compressors, pumps, and the like. Referring to FIG. 1, the rotary machine may, for example, be an internal combustion engine of the presently commercial Wankel type comprising a stationary outer body or housing 10 having a rotor cavity 12 that is defined by an inwardly facing peripheral wall 14 and a pair of axially spaced end walls 16. In the Wankel engine the peripheral wall 14 is in the shape of a two-lobed epitrochoid or a curve parallel thereto and a rotor 18 having the general shape of a triangle with three peripheral faces 20 is mounted in the rotor cavity 12 on an eccentric 21 of a crankshaft 22. Crankshaft 22 is journaled on opposite sides of the rotor 18 in the housing 10 with its axis 23 coincident with the axis of cavity 12 and the eccentric's axis 24 offset from and parallel thereto. Gearing, not shown, between the housing 10 and the rotor 18 enforces a fixed, cyclic relation between the rotor and the output shaft and the rotor faces cooperate with the peripheral wall and with the end walls to define three variable volume combustion or working chambers 25. Chambers 25 are spaced around the rotor and move with the rotor within the housing as the rotor rotates about its axis 24 while planetating with respect to the crankshaft axis 23. A fuel-air inlet passage 26 provides for admission of fuel-air mixture to each chamber, a spark plug 27 provides for igniting the mixture, and an exhaust passage 28 provides for exhausting the products of combustion from each chamber as the rotor rotates with each chamber undergoing intake, compression, expansion and exhaust to provide a power phase for each revolution of the engine output.

Figure 3:
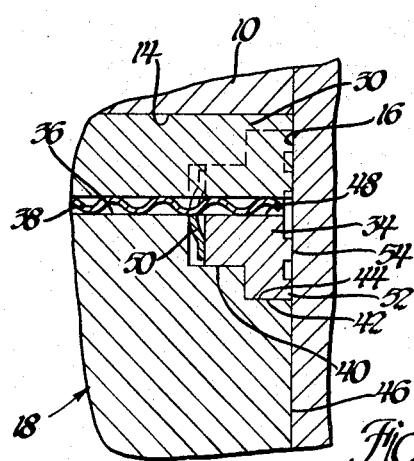
FIG. 3 is an enlarged partial view taken along the line 3—3 in FIG. 1.
Figure 2:
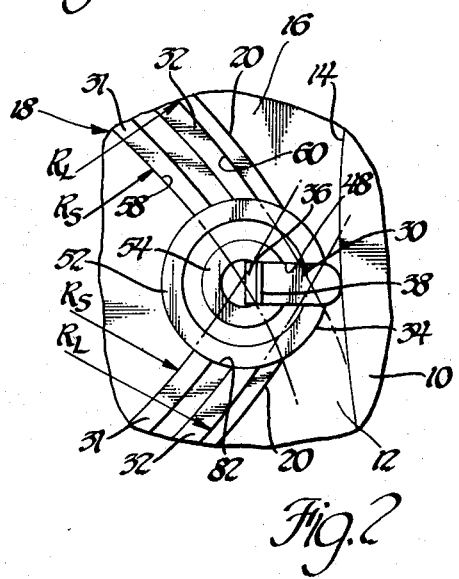
FIG. 2 is an enlarged view of one corner of the rotor shown in FIG. 1.

Sealing of the chambers 25 for such operation is provided by apex seals 30 which are mounted on the rotor 18 at each rotor apex and extend from one housing end wall to the other, side seals 31 and 32 which are mounted in pairs in each rotor side and extend between adjacent rotor apexes, and corner seals 34 which are mounted on each side of the rotor at each rotor apex and sealingly link the side seals and apex seals. Referring to FIGS. 2 and 3, each of the apex seals 30 is mounted in a radially outwardly facing groove 36 that extends axially through the rotor 18 with a wave spring 38 positioned between the base of the groove 36 and the base of the apex seal 30 to urge the seal 30 radially outward into sealing engagement with the peripheral wall 14. Each of the corner seals 34 has a circular configuration having a small diameter portion 40 and a large diameter outer portion 42. Each of the corner seals 34 is slidably received in an accommodating stepped bore or aperture 44 which is formed in one side 46 of the rotor 18 at each rotor apex parallel with the rotor axis and radially aligned with the apex seal groove 36 to which it joins. Each corner seal 34 has a radially outwardly facing slot 48 for receiving and sealingly linking with one outboard end of the associated apex seal 30. A spring 50 positioned between the bottom of each corner seal aperture 44 and the interior end of each corner seal 34 urges the corner seal axially outward against the opposed end wall 16, there being provided a pair of circular arc ribs 52 and 54 on the outboard end of the large diameter portion 42 to engage the end wall to provide labyrinth type sealing.

Figure 4:
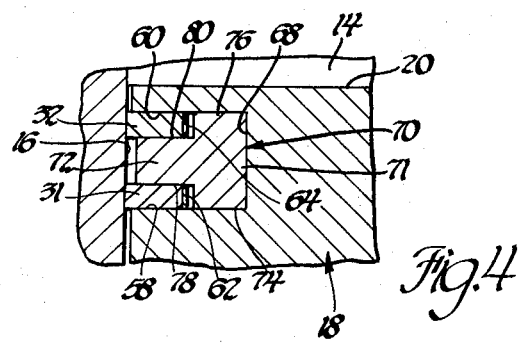
FIG. 4 is an enlarged partial view taken along the line 4—4 in FIG. 1.

Referring to FIGS. 1, 2 and 4, the side seals 31 and 32 are mounted in pairs in accommodating side seal grooves 58 and 60 in each side of the rotor and extend between and sealingly abut with the large diameter portion 42 of the corner seals 34. Wave springs 62 and 64 mounted between the bottom of the grooves 58 and 60 and the interior sides of the side seals 31 and 32 urge the side seals axially outward against the opposite end wall 16. Thus, with the apex seals 30 sealing against the peripheral wall 14, the side seals 31 and 32 sealing against the end walls 16 and the corner seals 34 sealingly linking the side seals and apex seals, each of the chambers 25 is effectively sealed as the rotor planetates.

In the construction of such machines, it is common practice to machine each of the rotor faces 20 to a circular arc surface with each such circular arc surface generated about a center line 66 which lies on a plane passing through the rotor's axis 24 and the opposite rotor apex and is parallel to the rotor axis 24 as shown in FIG. 1. Furthermore, it is common practice that the side seal grooves 58 and 60 are parallel with circular arc walls generated about this same center line 66 and furthermore that the side seal grooves have high depth-to-width ratios such as on the order of 4:1. As a general rule, end mill cutters are not satisfactory for arcuate grooves having such high depth-to-width ratios and as a result, cutting tools other than end mill cutters have been employed to cut these grooves.

According to the present invention, the side seal groove construction is such that conventional end mill cutters may be employed in the machining of the rotor for these grooves as will now be disclosed. Referring to FIG. 1, it will be observed that the radially inwardly located groove 58 has the smallest radius from the center line 66 which is indicated as $R_S$ while the radially outwardly located groove 60 has the largest radius which is indicated as $R_L$. Instead of machining the two side seal grooves 58 and 60 separately, there is machined with a conventional end mill a single axially facing circular arc groove 68 whose radially inwardly facing wall has the radius $R_L$ and radially outwardly facing wall has the radius $R_S$ and whose depth is greater than that of the side seal grooves desired. Furthermore, as shown in FIG. 2, the large diameter portion 42 of the corner seals 34 and the corresponding large diameter portion of the accommodating aperture 44 is large enough diameter-wise so that the end mill cutter used to cut the circular arc groove 68 may pass through the corner seal aperture 44 and thence freely past the rotor face so that the end mill need not be advanced or retracted at the corner seal apertures thereby simplifying the machining operation. With the grooves 68 thus machined, preformed circular arc inserts 70 are secured in the grooves 68. The circular arc inserts 70 have a T-shape in radial section as shown in FIG. 4 provided by a large radial section 71 and a small radial section 72. The large radial section 71 has radially inwardly and outwardly facing circular arc walls 74 and 76 having radii corresponding to $R_S$ and $R_L$, respectively, to provide for press fitting the arcuate inserts 70 in the bottom of grooves 68. The small radial section 72 is axially outward of the large radial section and has radially inwardly and outwardly facing circular arc groove walls 78 and 80 whose radii are sized in relation to the radii $R_S$ and $R_L$, respectively, to provide the desired side seal groove width while the axial length of this section is determined to provide the desired side seal groove depth. For example, given the groove width desired, this dimension is added to $R_S$ to obtain the radius of the insert's inner groove wall 78 and is subtracted from $R_L$ to obtain the radius of the insert's outer groove wall 80. Furthermore, the ends 83 of the inserts 70 are provided with a concave circular arc as shown in FIG. 2 to provide continuation of the large diameter portion of the corner seal apertures 44.

Thus, the side seal groove widths are not determinative of whether an end mill cutter may be used since the boundary radii $R_S$ and $R_L$ representing the smallest radius of the radially inward side seal groove and the largest radius of the radially outward side seal groove are now determinative of the size of the cutter to be used in machining the rotor for these grooves.

The above described embodiment is illustrative of the invention which may be modified within the scope of the appended claims.

We claim:

1. A rotor for a rotary machine having an axis of rotation, a plurality of adjoining peripheral faces spaced about said axis, a pair of sides spaced along and extending radially to said faces, an axially facing corner seal aperture at the juncture of each adjoining pair of said faces and one of said sides, an axially facing arcuate groove in each said side formed by said rotor and extending between the apertures at the two junctures of each face having a radially inwardly facing wall and a radially outwardly facing wall, and an arcuate insert mounted in each said arcutate groove having a radially inwardly facing wall and a radially outwardly facing wall for cooperating with the respective outwardly and inwardly facing groove walls to provide a pair of axially facing arcuate side seal grooves.

2. A rotor for a rotary machine having an axis of rotation, a plurality of adjoining peripheral faces extending parallel to said axis and equally, radially spaced from said axis, a pair of sides spaced along and perpendicular to said axis and extending radially to said faces, an axially facing corner seal aperture extending parallel to said axis at the juncture of each adjoining pair of said faces and one of said sides, an axially facing circular arc groove in each said side formed by said rotor and extending between the apertures at the two junctures of each face having a radially inwardly facing circular arc wall and a radially outwardly facing circular arc wall extending parallel to said axis, said circular arc walls having a common center line parallel to said axis and radii that pass through the apertures at the opposite groove ends without intersecting any of said faces, and a circular arc insert mounted in each said circular arc groove having a radially inwardly facing wall and a radially outwardly facing wall for cooperating with the respective outwardly and inwardly facing groove walls to provide a pair of axially facing circular arc side seal grooves.

3. A rotor for a rotary machine having an axis of rotation, a plurality of adjoining peripheral faces extending parallel to said axis and equally, radially spaced from said axis, a pair of sides spaced along and perpendicular to said axis and extending radially to said faces, an axially facing corner seal aperture extending parallel to said axis at the juncture of each adjoining pair of said faces and one of said sides, an axially facing circular arc groove in each said side formed by said rotor and extending between the apertures at the two junctures of each face having a radially inwardly facing circular arc wall and a radially outwardly facing circular arc wall extending parallel to said axis, said circular arc groove walls having a center line parallel to said axis and radii that pass through the apertures at the opposite groove ends without intersecting any of said faces, a circular arc insert inserted in each said circular arc groove, each said insert having a large radial section with radially inwardly and outwardly facing walls press fitted to said groove walls and a small radial section with radially inwardly and outwardly facing walls of larger and smaller radius than the respective radially inwardly and outwardly facing walls of said large radial section for cooperating with the respective outwardly and inwardly facing groove walls to provide a pair of axially facing radially spaced circular arc side seal grooves whose width is determined by the difference in radii of the cooperating groove walls and said small radial section walls and whose depth is determined by the axial length of said small radial section walls.

4. A rotor for a rotary machine having an axis of rotation, a plurality of adjoining peripheral faces spaced about said axis, a pair of sides spaced along and extending radially to said faces, an axially facing corner seal aperture at the juncture of each adjoining pair of said faces and one of said sides, an axially facing arcuate groove in each said side formed by said motor and extending between the apertures at the two junctures of each face having a radially inwardly facing wall and a radially outwardly facing wall, and an arcuate insert mounted in each said arcuate groove having a wall for cooperating with one of the groove walls to provide an axially facing arcuate side seal groove.

* * * * *

PO-1050
(5/69)

UNITED STATES PATENT OFFICE
CERTIFICATE OF CORRECTION

Patent No. 3,773,442  Dated November 20, 1973

Inventor(s) Alfred J. Mitchell, Mirko A. Bratkovik

It is certified that error appears in the above-identified patent and that said Letters Patent are hereby corrected as shown below:

In the claims, column 6, line 18, "motor" should read -- rotor --.

Signed and sealed this 1st day of October 1974.

(SEAL)
Attest:

McCOY M. GIBSON JR.
Attesting Officer

C. MARSHALL DANN
Commissioner of Patents